S. STUCKY.
VALVE.
APPLICATION FILED AUG. 11, 1910.
999,608.
Patented Aug. 1, 1911.
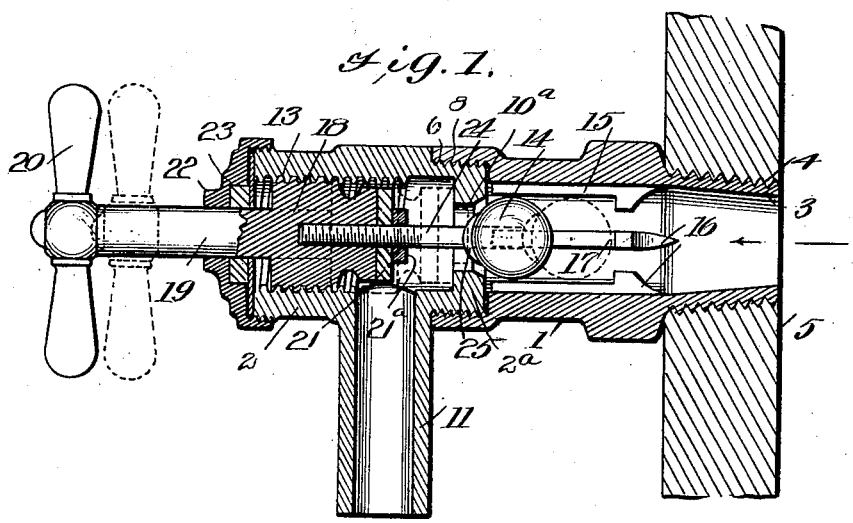
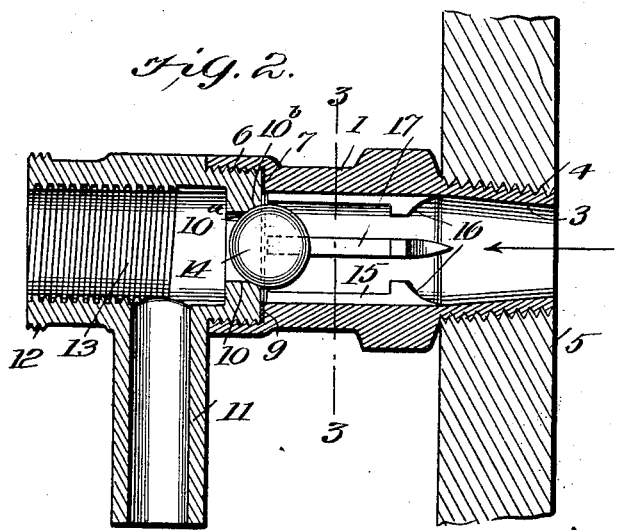
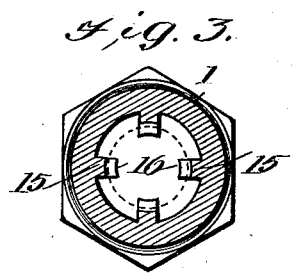
WITNESSES:
F. C. Barry
C. E. Trainor
INVENTOR
STEPHEN STUCKY
BY Munn & Co.
ATTORNEYS

UNITED STATES PATENT OFFICE.

STEPHEN STUCKY, OF OXFORD, ALABAMA, ASSIGNOR OF ONE-HALF TO WILLIAM H. McKLEROY, OF ANNISTON, ALABAMA.

VALVE.

999,608. Specification of Letters Patent. Patented Aug. 1, 1911.

Application filed August 11, 1910. Serial No. 576,628.

*To all whom it may concern:*

Be it known that I, STEPHEN STUCKY, a citizen of the United States, residing at Oxford, in the county of Calhoun and State of Alabama, have invented a new and useful Improvement in Valves, of which the following is a specification.

My invention is an improvement in valves, and consists in certain novel construction, and combinations of parts, hereinafter described and claimed.

The object of the invention is to provide a mechanism for use with the ordinary form of outlet valve casing for closing the passage of the valve casing, when the valve is removed for any purpose, and wherein the said mechanism is normally held in inoperative position by the valve.

Referring to the drawings forming a part hereof, Figure 1 is a longitudinal section of the valve. Fig. 2 is a similar view of the casing with the valve and stem removed, and Fig. 3 is a section on the line 3—3 of Fig. 2.

In the present embodiment of the invention, the casing of the valve is substantially cylindrical in cross-section, and is composed of two sections 1 and 2. The section 1 is tapered and externally threaded at one end at 3, to engage a tapered opening 4 in a receptacle 5, and the other end is internally enlarged and threaded at 6, a shoulder 7 being formed between the enlarged portion and the main portion. The section 2 at one end is reduced and externally threaded at 8 to fit within the adjacent end of the section 1, and a packing 9 is arranged between the shoulder 7 and the end of the section 2. The inner end of the section 2 is provided with a diaphragm $2^a$ and a valve seat is formed on each side of the diaphragm as at $10^a$ and $10^b$, and a pipe 11 leads off laterally from the said section. The outer end of the section 2 is externally threaded at 12 for a short distance, and is internally threaded at 13 to approximately the center of the pipe 11. A plug valve 18 of ordinary form is threaded into the section 2, and the said valve is provided with a stem 19, extending out of the casing, and having a handle 20. The usual packing disks 21 and $21^a$ are secured to the end of the plug, and the said disks coöperate with the valve seat $10^a$ before mentioned. A cap 22 is threaded onto the outer end of the section 2, the cap having an opening to permit the passage of the stem, and a packing 23 is arranged between the cap and the end of the casing.

The above is the usual form of valve, and to permit the said valve to be removed for repairs, while at the same time preventing the passage of water through the casing the following mechanism is provided. A ball valve 14 is arranged in the section 1, and coöperates with the seat $10^b$. The ball valve is movable longitudinally of the section, and is guided in its movement by ribs 15, on the inner face of the casing and arranged longitudinally thereof. The ribs are arranged at angles of 90° with respect to each other, and each is provided with a stop 16 at the end remote from the seat, to limit the movement of the ball. The pressure of the liquid in the receptacle, will hold the ball valve in the position shown in Fig. 2 when the valve stem is removed, and the usual screw for holding the disks 21 and $21^a$ on the valve 18 is replaced by a screw rod 24, engaging a threaded opening in the valve 18 at one end, and having at the other end a cup 25 for engaging the ball 14.

The screw rod is of such length, that when the valve 18 is open as shown in Fig. 1, the ball valve is yet unseated, sufficient space being left to prevent a free flow of liquid. When the valve 18 is closed, the valve 14 is in the position shown in dotted lines in Fig. 1.

When for any reason it is necessary to remove the valve 18, it is turned outwardly in the usual manner. Before the said valve is out of the casing, the ball valve 14 is seated, thus cutting off the flow of liquid. The pressure holds the valve on its seat until the valve 18 is replaced.

It will be evident that the valve 14 does not interfere in any manner with the operation of the valve 18, and does not come into action until the said valve 18 is out of action. The valve 14 furnishes however an efficient stop when the valve 18 is withdrawn. The valve 14 is accessible for repairs or cleaning, by removing the outer section 2 of the casing.

I claim—

1. In combination, a valve casing composed of a plurality of sections, the inner section being internally threaded at one end, and having an annular shoulder between the threaded portion and the main portion, the outer section having one end reduced and threaded into the first named section, a diaphragm having a central opening at the reduced end of the outer section, a valve seat being formed on each side of the diaphragm, a valve threaded into the outer section and coöperating with one of the seats to close the passage through the casing, said outer section having a lateral discharge outlet, a ball valve movable in the inner section, said section having internal longitudinal ribs for guiding the ball, each rib having a stop at the end of the rib remote from the seat, and a screw rod threaded into the plug, said rod having a cup at its free end for engaging the ball valve and normally holding it unseated.

2. In a device of the character specified, a valve casing comprising a plurality of sections detachably connected together, the outer section having a seat, a valve in the outer section coöperating with one side of the seat, a ball valve in the inner section coöperating with the opposite side of the seat, means for operating the first-named valve, means in connection with the said first-named valve for normally retaining the ball valve unseated, said inner section having internal longitudinal ribs for guiding the ball valve, each rib having a stop at the end of the rib remote from the seat for limiting the movement of the valve.

STEPHEN STUCKY.

Witnesses:
RUBY BENTLEY,
HUGH A. SINGLETON.

Copies of this patent may be obtained for five cents each, by addressing the "Commissioner of Patents, Washington, D. C."